US006859870B1

United States Patent
Kim et al.

(10) Patent No.: US 6,859,870 B1
(45) Date of Patent: Feb. 22, 2005

(54) METHOD AND APPARATUS FOR COMPRESSING VLIW INSTRUCTION AND SHARING SUBINSTRUCTIONS

(75) Inventors: Donglok Kim, Seattle, WA (US); Stefan G. Berg, Seattle, WA (US); Weiyun Sun, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/519,695

(22) Filed: Mar. 7, 2000

(51) Int. Cl.$^7$ .......................... G06F 15/00; G06F 15/76
(52) U.S. Cl. .......................................... 712/24; 712/22
(58) Field of Search ............................ 712/22, 24, 215

(56) References Cited

U.S. PATENT DOCUMENTS

| | | | |
|---|---|---|---|
| 5,057,837 A | | 10/1991 | Colwell et al. |
| 5,787,302 A | * | 7/1998 | Hampapuram et al. ....... 712/24 |
| 5,819,058 A | * | 10/1998 | Miller et al. ................. 712/210 |
| 5,826,054 A | | 10/1998 | Jacobs et al. ............... 712/213 |
| 5,852,741 A | * | 12/1998 | Jacobs et al. ................... 712/24 |
| 5,878,267 A | * | 3/1999 | Hampapuram et al. ....... 712/24 |
| 6,044,450 A | * | 3/2000 | Tsushima et al. ............. 712/24 |
| 6,173,389 B1 | * | 1/2001 | Pechanek et al. ............. 712/24 |
| 6,401,190 B1 | * | 6/2002 | Nishioka et al. .............. 712/24 |

OTHER PUBLICATIONS

Dictionary of Computers, Information Processing, & Telecommunications. Jerry M. Rosenberg. Second Edition. John Wiley & Sons, Inc.: 1987. pp. 451–452.*

Basoglu et al.; "High Performance Image Computing with Modern Microprocessors," CCC 0899–9457/98/060407–09, vol. 9 pp 407–415 John Wiley & Sons, Inc. 1998.

Seshan Nat; "High VelociTI PRocessing," IEEE Signal Processing Magazine, 105305888/98; Mar. 1998.

Basoglu et al., :A Single–Chip Processor for MEdia Applications: The MAP1000, International Journal of Imaging Systems and Technology; 1999.

Stotland et al., "Image Computing Library for a Next–Generation VLIW Multimedia Processor," SPIE Electronic Imaging, vol. 3655 pp 47–58; 1999.

Managuli et al.; "An Efficient Convolution Algorithm for VLIW Mediaprocessors," SPIE Electronic Imaging, vol. 3655, pp65–74; 1999.

Rathman et al.; "Processing the New World of Interactive Media," IEEE Signal Processing Magazine, vol. 15, No. 2, pp 108–117; 1998.

Purcell, Steve; "The Impact of Mpact 2," IEEE Signal Processing Magazine vol. 15, No. 2, pp 102–107, 1998.

* cited by examiner

*Primary Examiner*—Eddie Chan
*Assistant Examiner*—Aimee J. Li
(74) *Attorney, Agent, or Firm*—Steven P. Koda (57) ABSTRACT

A VLIW instruction format is introduced having a set of control bits which identify subinstruction sharing conditions. At compilation the VLIW instruction is analyzed to identify subinstruction sharing opportunities. Such opportunities are encoded in the control bits of the instruction. Before the instruction is moved into the instruction cache, the instruction is compressed into the new format to delete select redundant occurrences of a subinstruction. Specifically, where a subinstruction is to be shared by corresponding functional processing units of respective clusters, the subinstruction need only appear in the instruction once. The redundant appearance is deleted. The control bits are decoded at instruction parsing time to route a shared subinstruction to the associated functional processing units.

2 Claims, 5 Drawing Sheets

METHOD AND APPARATUS FOR COMPRESSING VLIW INSTRUCTION AND SHARING SUBINSTRUCTIONS

BACKGROUND OF THE INVENTION

This invention relates to very long instruction word (VLIW) computing architectures, and more particularly to methods and apparatus for reducing storage requirements of VLIW instructions.

Multimedia computing applications such as image processing are more efficiently implemented using parallel structures for handling multiple streams of data. VLIW processors, such as the TMS320C6x manufactured by Texas Instruments of Dallas Tex. and the MAP1000 manufactured by Hitachi Ltd. of Tokyo Japan and Equator Technologies of Campbell Calif., support a large degree of parallelism of both data streams and instruction streams to implement parallel or pipelined execution of program instructions.

A VLIW processor includes one or more of multiple homogeneous processing blocks referred to as clusters. Each cluster includes a common number of functional processing units. A VLIW instruction includes multiple subinstruction fields. The size of the VLIW instruction grows linearly with the number of parallel operations being defined concurrently in the subinstruction fields. The subinstructions present in an instruction are distributed among functional processing units for parallel execution.

Conventional VLIW processors typically execute fewer than ten operations per instruction. The number of concurrent executions is likely to increase substantially in future media processors with instructions likely to be 256 or 512 bits wide. As the size of the instruction increases, however, a correspondingly increased burden on the data flow and memory structures occurs. To provide enough instruction fetch bandwidth, the VLIW instructions typically are fetched first from external memory and stored in an on-chip instruction cache before being executed. Thrashing of the cache (i.e., cyclic misses), for example, during a tight processing loop is very undesirable resulting in degraded performance. Accordingly, it is increasingly desirable to manage the instruction cache effectively to sustain a desired high processing throughput.

At the same time, the need for a larger instruction cache increases as the clock frequency of the processor increases, as wider VLIW architectures are adapted, and as more complex algorithms are developed. Accordingly, there is a need for methods of efficiently handling and caching VLIW instructions.

SUMMARY OF THE INVENTION

According to the invention, subinstructions of a VLIW instruction are shared among functional processing units to reduce the size of the VLIW instruction as stored in instruction cache, and in some embodiments, main memory. Specifically, the VLIW in instruction is compressed in cases of subinstruction sharing. In some embodiments the instruction is compressed at compilation time and stored in main memory in compressed format. In other embodiments the instruction is stored in main memory in uncompressed format and compressed before being stored in cache memory.

According to one aspect of the invention, a set of instruction-compression control bits are associated with each VLIW instruction. In one embodiment the VLIW instruction is formatted to include the set of control bits within the instruction. A VLIW instruction includes a plurality of subinstruction fields, the set of instruction-compression control bits, and other miscellaneous control bits, such as those describing the locations of NOP instructions, (i.e., empty).

In a fully expanded format, a VLIW instruction includes a prescribed number of subinstruction fields, where the number of fields is determined by the architecture of the processor executing the VLIW instruction. Some of the subinstruction fields may be NOP instructions. Further some subinstruction fields may include the same subinstruction as in other subinstruction fields. It is known to compress an instruction to remove the space allocated for the NOP instructions. According to this invention a scheme is provided to reduce the redundancies of subinstructions in select cases.

Consider an architecture in which an instruction includes four subinstruction fields. There are 15 situations of interest for such an instruction. In one situation there are no redundant subinstructions, (e.g., ABCD). In the remaining situations there is some degree of redundancy among subinstructions, (e.g., AAAA, AAAB, AABA, ABAA, BAAA, AABB, ABAB, ABBA, AABC, ABAC, ABCA, BAAC, BACA, BCAA). Note that A, B, C, and D are used in the sense of identifying whether a subinstruction is the same or different from another subinstruction in the field. One skilled in the art will appreciate that there are many different subinstructions A. Similarly, there are many different subinstructions B, C and D.

For an architecture in which there are more subinstruction fields, there are additional situations of redundant subinstructions. For any given architecture, there are not more than $2^z$ possible situations, where 'z' is the number of subinstruction fields. To cover every redundancy situation, there would be as many as 'z' control bits, where z is the maximum number of subinstruction fields allowed in the processor architecture. In some embodiments all such situations are covered by including 'z' control bits with each instruction. However, as the instruction width increases, it may be undesirable to add so many extra control bits for subinstruction sharing. In particular, the cost of so many bits may seem excessive when there tends to be a pattern among the subinstructions redundancies that come up over and over again in practice. As a result, in a preferred embodiment the number of control bits is reduced to less than 'z' to handle a prescribed number of the approximately $2^z$ subinstruction sharing situations possible.

Different processors can be designed for different applications where the pattern of subinstruction redundancies varies. Further the cases of subinstruction redundancies covered for subinstruction sharing may be strategically selected for a given processor to have greatest impact on those applications for which the processor is targeted, (e.g., for image processing applications).

Although any subinstruction reduncy situation is potentially covered and designed into the processor architecture, in one strategy all or less than all subinstruction sharing possibilities are covered. In one embodiment subinstruction sharing is provided for redundant subinstructions destined for corresponding functional processing units. A functional processing unit is a part of a processor. A processor includes 'z' functional processing units, where 'z' is the maximum number of subinstructions in an instruction. More specifically, however, a processor includes a plurality of clusters, in which each cluster includes a common number of functional processing units (FPU's). For each FPU in one cluster there is a corresponding FPU in each other cluster. Each corresponding FPU has the same functionalities. For example where there are three clusters of four FPU's, there are four sets of corresponding FPU's. In one strategy each permutation of subinstruction redundancy among any two or more corresponding FPU's are covered. For such example z=7, and there are 7 instruction-compression control bits per instruction. This is less than the maximum number of control bits (e.g., 12) to cover every possible subinstruction sharing situation among the 12 functional processing units.

According to another aspect of the invention, redundant subinstructions destined for a corresponding functional processing unit in each cluster are compressed. Specifically, when the same subinstruction is present in an instruction for the corresponding functional processing unit in at least two clusters, then according to this invention, only one copy of the subinstructions need be stored. The redundant subinstruction for the corresponding functional processing unit is omitted, resulting in a compressed instruction. For such a compression there is a corresponding condition of the instruction-compression control bits which identifies the redundant subinstruction fields sharing a specific subinstruction.

According to another aspect of this invention, during compilation of a computer program for the VLIW processor, (e.g., compilation of higher language source code or assembly of assembler source code), the instruction-compression control bits are set to specify the conditions which define each compression for a given instruction. The instruction, including the instruction-compression control bits, is stored in memory in either compressed or uncompressed format. When stored in uncompressed format, the instruction is compressed before being stored in the processor's on-chip instruction cache. Accordingly, the instruction is compressed at any step between the main memory storage of the instruction and the on-chip instruction cache storage of the instruction, (e.g., it is compressed and restored in main memory; it is compressed and stored in a primary cache or secondary cache; it is compressed when moved to the on-chip instruction cache).

According to another aspect of this invention, the condition of the instruction-compression control bits determines how the compressed instruction is to be decompressed for execution. In particular, the control bits determine how one or more subinstructions in the compressed instruction are to be shared among functional processing units of the VLIW processor for concurrent execution. The set of instruction-compression control bits identify one or more compression conditions in which redundant corresponding subinstructions are stored once, rather than redundantly. Each identified condition corresponds to a subinstruction to be shared by at least two corresponding functional processing units.

The advantage of associating functional processing units of differing clusters as being corresponding functional processing units, and compressing the redundant subinstructions destined for such corresponding functional processing units is due to the regular program structure of image computing algorithms. Applicants have observed many tight loops in their program code for image computing library functions in which the same subinstructions are used in multiple clusters. For example in a 2D convolution function implemented on a VLIW processor having two clusters, the most frequently-used subinstructions are inner product and partitioned compaction of the inner product results. It has been observed that for most instructions that perform either of these subinstructions, multiple clusters are assigned the same subinstruction. Specifically in assembly code written for the MAP1000 processor for such function, applicants observed that the tight loop program has 67 instructions out of 133 instructions that consist of exactly the same subinstructions (including operands) for both clusters. Accordingly, the redundancy of subinstructions destined for corresponding functional processing units is a significant occurrence in important image processing algorithms. By avoiding the redundancy in VLIW instructions so that fewer instruction bits are needed if the same subinstruction is to be executed on multiple clusters, program size is reduced. In addition, efficiency of the instruction cache usage is improved, and the effective instruction fetch bandwidth is increased.

These and other aspects and advantages of the invention will be better understood by reference to the following detailed description taken in conjunction with the accompanying drawings.

DESCRIPTION OF SPECIFIC EMBODIMENTS

Overview

Figure 1:
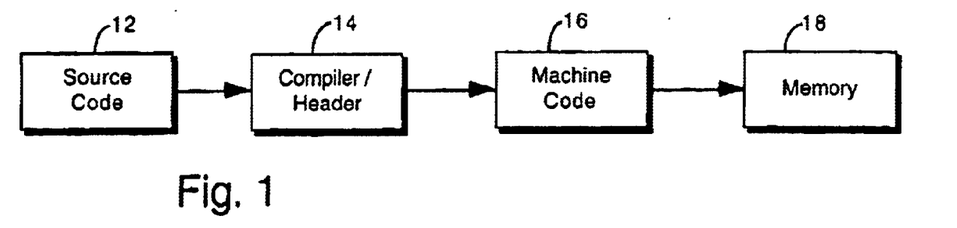
FIG. 1 is a block diagram of development and storage of a computer program having VLIW instructions.

FIG. 1 shows a block diagram of program compilation and storage for a very long instruction word (VLIW) processor. The term "very long instruction word" VLIW is a term of art in the fields of computer system and processor architecture, parallel processing and image processing, generally referring to architectures in which a processor is able to handle an instruction which typically is 64 bits or longer, and consists of multiple subinstructions.

A program engineer prepares, tests and debugs source code 12. The source code 12 is written in assembler language or a higher order programming language. The source code then is compiled/assembled by compiler/assembler 14 resulting in machine code 16. The machine code 16 is stored in memory 18 of a computer having a processor which is to execute the machine code 16.

Figure 2:
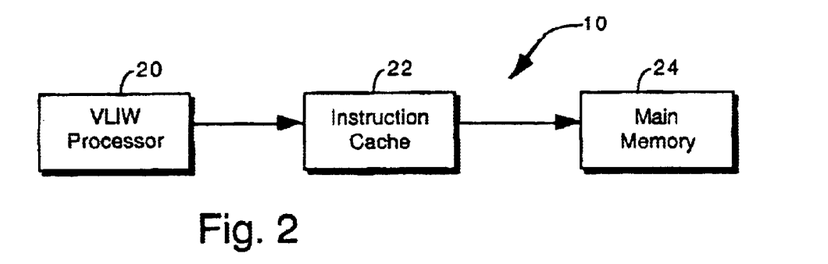
FIG. 2 is a partial block diagram of a computer system having a VLIW processor.
Figure 3:
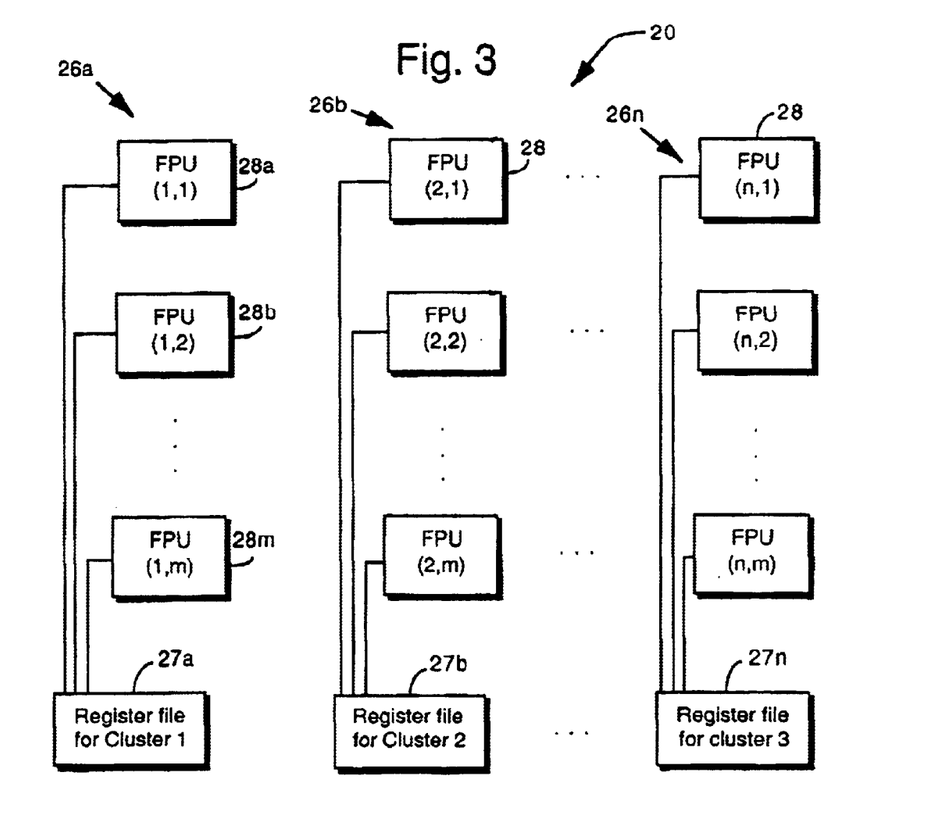
FIG. 3 is a block diagram of a VLIW processor architecture.

Referring to FIG. 2, a host computer 10 includes a very long instruction word (VLIW) processor 20, an instruction cache 22, and main memory 24. In a preferred embodiment the instruction cache 22 is part of the processor 20 (being located on-chip). The main memory is the memory 18 or receives the computer program machine code 16 from the memory 18. Referring to FIG. 3, a typical VLIW processor 20 architecture includes a pluralities of clusters 26 of functional processing units (FPU's) 28. Each cluster 26 includes a common number of functional processing units 28. As a result, there is a one to one correspondence of functional processing units 28 in the differing clusters 26. FIG. 3 shows a generic architecture having 'n' clusters of 'm' functional processing units per cluster. A first cluster has functional processing units (1,1) to (1,m). A second cluster has functional processing units (2,l) to (2,m). The n-th cluster has functional processing units (n, 1) to (n,m). Accordingly there are n*m functional processing units. For each cluster 26, there is a dedicated register file 27. The values of n, m, and n*m are prescribed numbers determined by the processor 20 architecture. Such values may vary for differing embodiments. The value of n*m is a prescribed number corresponding to the maximum number of subinstructions which may be included in a VLIW instruction for a processor having n*m functional processing units.

Figure 4:
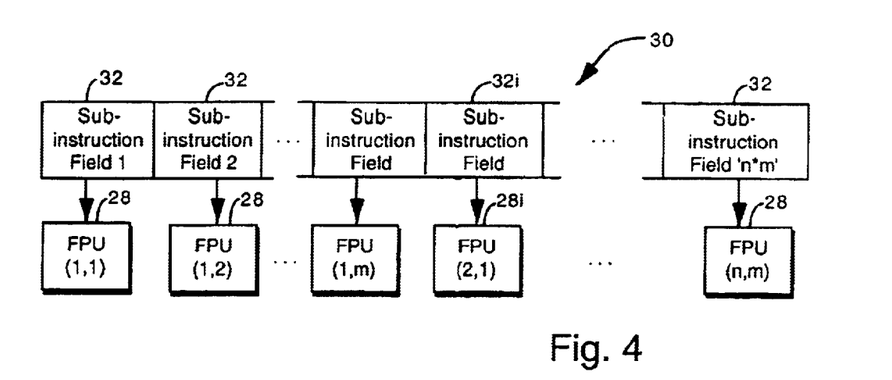
FIG. 4 is a diagram of a VLIW instruction format, identifying destinations for various subinstruction field contents for the processor of FIG. 3.

Referring to FIG. 4, an instruction format 30 for processor 20 includes up to n*m subinstruction fields 32. The content of each subinstruction field 32 is routed to a _corresponding functional processing unit 28 for processing. For an instruction in which all n*m subinstruction fields are filled, a subinstruction is routed to each one of the n*m functional processing units 28. Typically there is only one program counter for all n clusters 26. As a result, the functional processing units typically operate synchronously to concurrently execute the subinstructions of a given instruction.

When a subinstruction field 32$i$ is empty, the instruction 30 is compressed using conventional techniques. As a result the memory space occupied by the instruction is reduced. This invention relates to additional techniques which compress the instruction size when there are redundant subinstructions for corresponding functional processing units 28 of multiple clusters 26. In particular, in a tight loop of an image computing algorithm it has been observed that the same subinstruction is executed in multiple clusters. Conventionally, the subinstruction is repeated in each subinstruction field 32, resulting in an inefficient use of instruction cache 22 memory space and an inefficient application of memory transfer bandwidth. In a compressed instruction format according to an aspect of this invention, subinstructions are shared among multiple functional processing units 28.

Compressed Instruction Format

Figure 5:
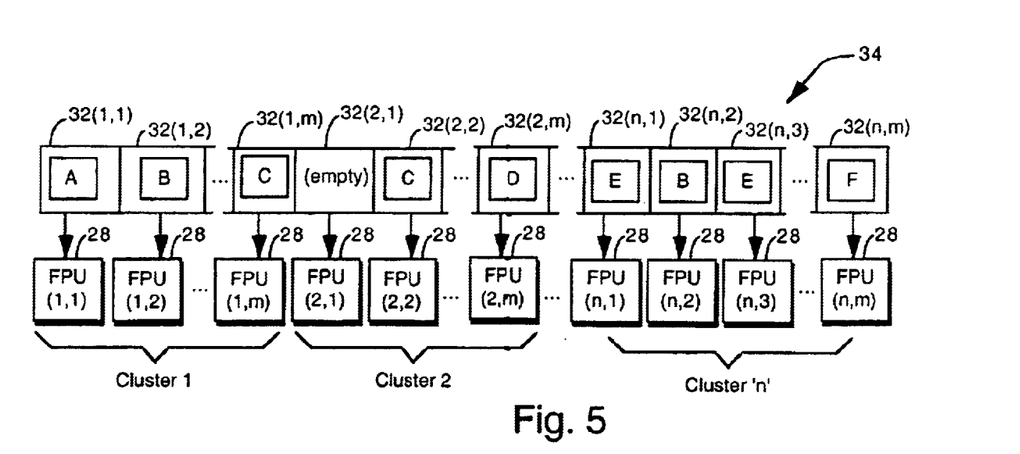
FIG. 5 is a diagram of an exemplary uncompressed VLIW instruction.

Referring to FIG. 5, an example of an uncompressed instruction 34 is shown including 'nxm' subinstruction fields 32 which store respective subinstructions 36. Some subinstruction fields 32 may be blank, (e.g., field 32(2,l)). Some subinstruction fields may include the same subinstruction as another subinstruction field. Each subinstruction field 32 is associated with a specific functional processing unit 28 of a specific cluster 26. In the example illustrated, subinstruction fields (1,l) to (1,m) are associated with the functional processing units (1,l) to (1,m) respectively of cluster 1. Subinstruction fields (2,l) to (2,m) are associated with the functional processing units (2,l) to (2,m) respectively of cluster 2. Each subinstruction field is similarly associated up to subinstruction fields (n,l) to (n,m) being associated with functional processing units (n,l) to (n,m) respectively of cluster n.

Note that functional processing units (__, 1) for each of clusters 1 through n are referred to herein as corresponding functional processing units. In particular, they are referred to the corresponding first functional processing unit of each of the multiple clusters. When the same subinstruction is included in a given instruction for processing by corresponding functional processing units (__,i), the instruction format is compressed to eliminate the redundancy. Note that when the same subinstruction is included, but for non-corresponding functional processing units (__,i) and (__,j), the redundancy is not treated, (i.e., the instruction format is not necessarily compressed). In some embodiments these redundancies also are treated, but in a preferred embodiment they are ignored. Such redundancies are ignored because they do not result in the gains in efficiency comparable to the gains in treating redundancies among subinstructions destined for corresponding functional processing units.

Figure 6:
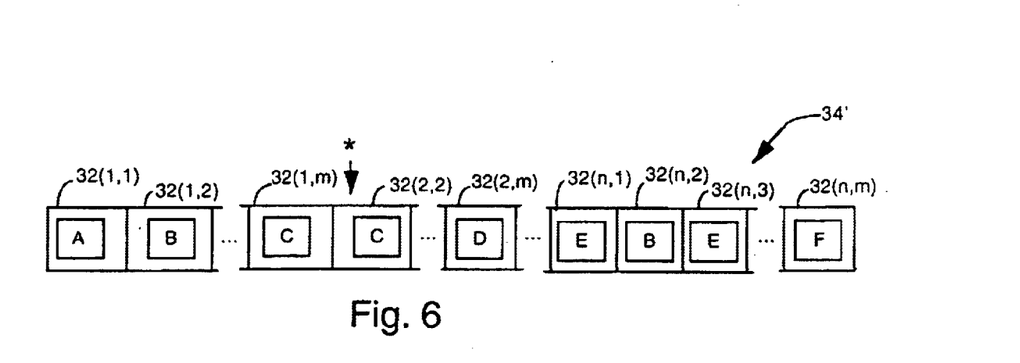
FIG. 6 is a diagram of a VLIW instruction to remove NOP subinstructions.

Referring to FIG. 6, the exemplary instruction 34 is shown in a conventional compressed format 34' in which the blank fields are omitted. The location of where the blank field would occur in the uncompressed format is shown with an asterisk ('*').

Figure 7:
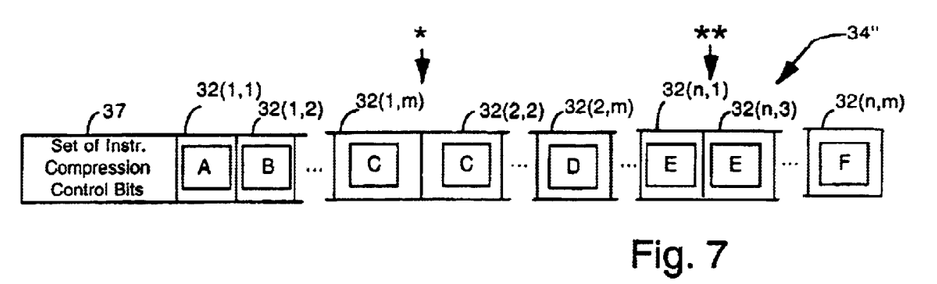
FIG. 7 is a diagram of a VLIW instruction compressed according to an embodiment of this invention to implement subinstruction sharing.

Referring to FIG. 7, the exemplary instruction 34 is shown in a compressed format 34" according to an aspect of this invention. In the compressed format, there is an area for a set 37 of instruction-compression control bits, along with one or more, preferable non-empty, subinstruction fields. Subinstructions fields for corresponding FPU's (__,i) which store the same subinstruction are reduced to include the subinstruction for only one of the corresponding functional processing units. Such corresponding functional processing units share the subinstruction.

With regard to the exemplary instruction depicted, note that the subinstruction which is destined for the second functional processing unit of both the first cluster and the n-th cluster have a common subinstruction. These FPU's (1,2) and (n,2) are corresponding functional processing units. Accordingly, the redundant subinstruction is omitted. In various embodiment the redundant subinstruction is omitted at the first occurrence, second occurrence or another occurrence. In the embodiment illustrated all but the first occurrence is omitted. The location where the omitted redundant field would occur in the uncompressed format is shown with a double asterisk ('**'). Also note that the empty subinstruction field also is compressed. In various embodiments the empty field may or may not be compressed, depending on whether the conventional compression technique is also implemented.

Also note that subinstruction fields 32(1,m) and 32(2,2) each have a common subinstruction 'C'. In some embodiments a compression operation is performed to avoid this redundancy. However, because such redundancy has been found as not to occur very often, the redundancy is left 'as is' in a preferred embodiment. Similarly, the subinstructions fields 32(n,1) and 32(n,3) also have a common subinstruction, 'E'. These are destined for FPU's in a common cluster. In some embodiments a compression operation is performed to avoid this redundancy. However, because such redundancy has been found as not to occur very often, the redundancy is left 'as is' in a preferred embodiment.

Figure 8:
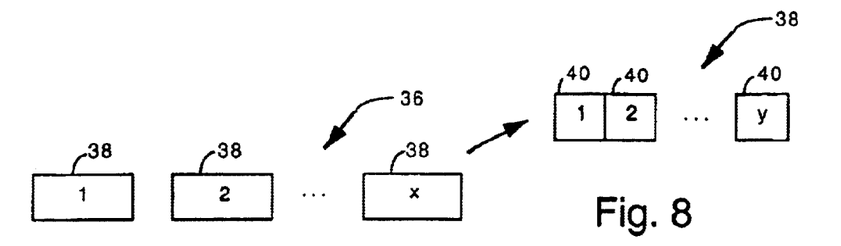
FIG. 8 is a diagram of the set of control bits included in the instruction of FIG. 7.

The set 37 of instruction-compression control bits includes enough bits to identify each possible condition in which corresponding functional processing units are to share a subinstruction. For example, where there are two clusters of 'm' FPU's per cluster, then the set 37 includes 'm' control bits. Where there are 'n' clusters of two FPU's per cluster, then the set 37 includes 'n' control bits. In an architecture having 'n' clusters of 'm' FPU's per cluster, the set 37 in a best mode embodiment includes n+m control bits, where n>2 and m>2. In other embodiments the number of control bits may vary. Table 1 below shows the bit encoding for an architecture in which the are 2 clusters of 2 functional processing units per cluster. For such architecture there are 2 control bits in the set 37.

TABLE 1

Control Bit Encoding

| | |
|---|---|
| 00 | No subinstruction sharing |
| 01 | First subinstruction in compressed format is shared by FPU's (__,1) |
| 10 | Second subinstruction in compressed format is shared by FPU's (__,2) |
| 11 | First subinstruction in compressed format is shared by FPU's (__,1), & Second Subinstruction in compressed format is shared by FPU's (__,2) |

Table 2 below shows the bit encoding for an architecture in which the are 2 clusters of 3 functional processing units per cluster. For such architecture there are 3 control bits in the set 37.

TABLE 2

Control Bit Encoding

| | |
|---|---|
| 000 | No subinstruction sharing |
| 001 | First subinstruction in compressed format is shared by FPU's (__,1) |
| 010 | Second subinstruction in compressed format is shared by FPU's (__,2) |
| 011 | First subinstruction in compressed format is shared by FPU's (__,1), & Second subinstruction in compressed format is shared by FPU's (__,2) |
| 100 | Third subinstruction in compressed format is shared by FPU's (__,3) |
| 101 | First subinstruction in compressed format is shared by FPU's (__,1), & Third subinstruction in compressed format is shared by FPU's (__,3) |
| 110 | Second subinstruction in compressed format is shared by FPU's (__,2), Third subinstruction in compressed format is shared by FPU's (__,3) |
| 111 | First subinstruction in compressed format is shared by FPU's (__,1), Second subinstruction in compressed format is shared by FPU's (__,2), Third subinstruction in compressed format is shared by FPU's (__,3) |

In various embodiments there are various encoding schemes that can be implemented to identify each potential compression condition in which a subinstruction is to be shared among two or more corresponding FPU's (__,i).

Because it may be undesirable to add a significant amount of control bits to each instruction, a subset of compression conditions may be identified by a reduced number of control bits. For example, in a four cluster architecture with two FPU's per cluster, four control bits could be used in a similar way as specified above, or three control bits could be used as described in Table 3 below.

TABLE 3

Control Bit Encoding

| | |
|---|---|
| 000 | No subinstruction sharing |
| 001 | First subinstruction in compressed format is shared by all FPU's (i,1), i = 1, 4 |
| 010 | Second subinstruction in compressed format is shared by FPU's (i,2), i = 1, 4 |
| 011 | First subinstruction in compressed format is shared by FPU's (i,1), Second subinstruction in compressed format is shared by FPU's (i,2), i = 1, 4 |
| 100 | First subinstruction in compressed format is shared by FPU's (1,1), (3,1), Second subinstruction in compressed format is shared by FPU's (1,2), (3,2), Third subinstruction in compressed format is shared by FPU's (2,1), (4,1), Fourth subinstruction in compressed format is shared by FPU's (2,2), (4,2) |
| 101 | First subinstruction in compressed format is shared by FPU's (1,1), (2,1), Second subinstruction in compressed format is shared by FPU's (1,2), (2,2), Third subinstruction in compressed format is shared by FPU's (3,1), (4,1), Fourth subinstruction in compressed format is shared by FPU's (3,2), (4,2) |
| 110 | First subinstruction in compressed format is shared by FPU's (1,1), (2,1), |

TABLE 3-continued

Control Bit Encoding

| | |
|---|---|
| | Second subinstruction in compressed format is shared by FPU's (1,2), (2,2), Third through sixth not shared |
| 111 | First though Fourth not shared, Fifth subinstruction in compressed format is shared by FPU's (3,1), (4,1), Sixth subinstruction in compressed format is shared by FPU's (3,2), (4,2), |

One skilled in the art will appreciate that different encoding schemes may be implemented to identify a variety of subinstruction sharing conditions. Different decoding architectures would accompany the different encoding schemes to implement a desired subinstruction sharing scheme.

Subinstruction Sharing

Figure 9:
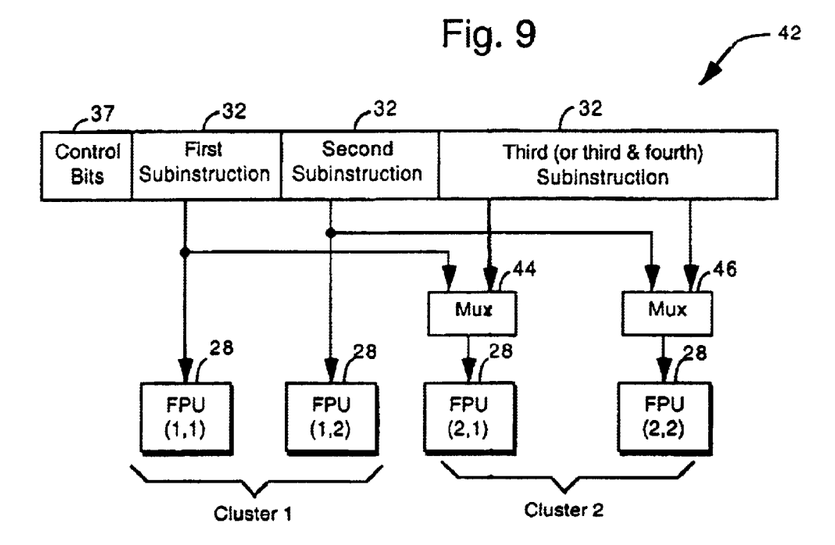
FIG. 9 is a diagram of a multiplexing architecture for decoding the control bits of an instruction to determine various subinstruction sharing conditions.
Figures 10A, 10B:
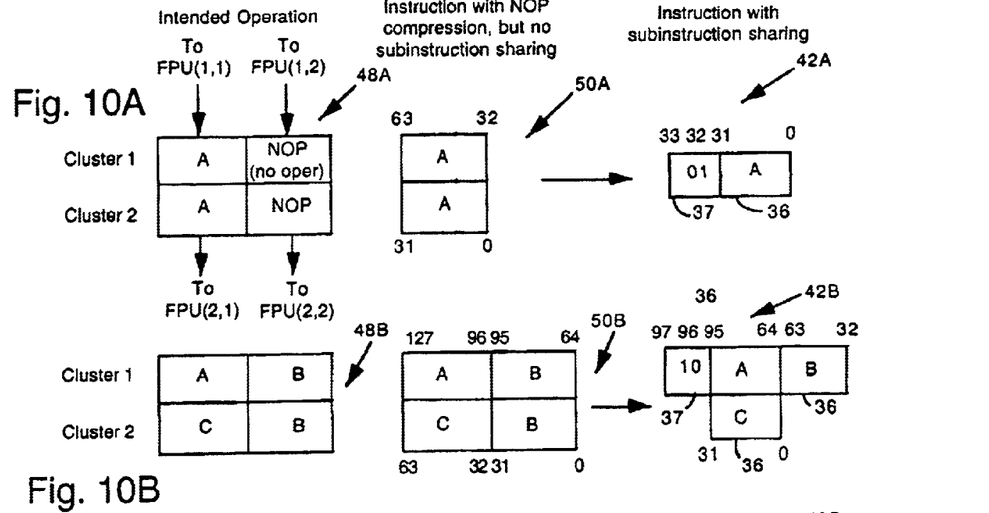
FIGS. 10A–10E are diagrams of exemplary instructions showing an intended distribution of the instruction, the instruction with NOP compression, and the instruction in a format for subinstruction sharing.
Figure 10C:
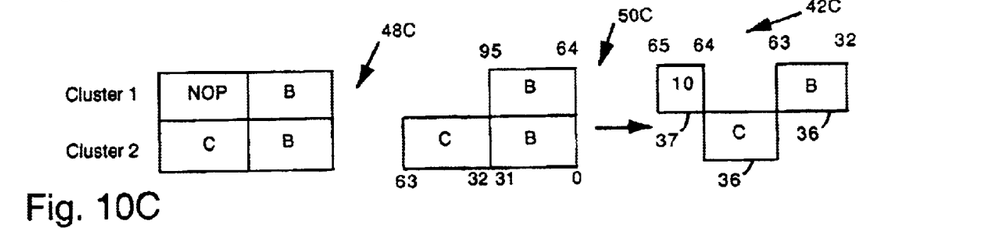
Figure 10D:
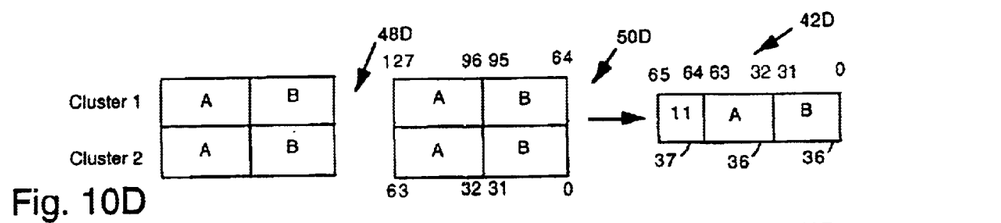
Figure 10E:
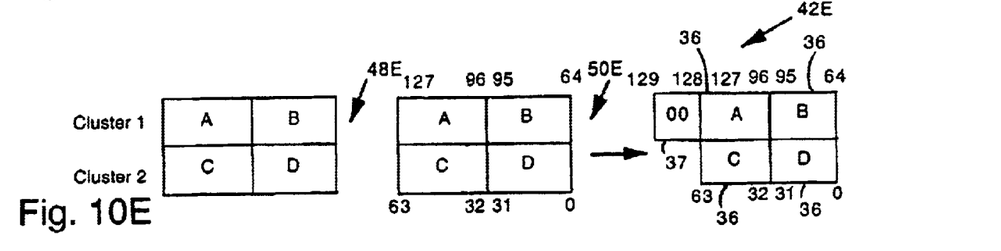

Referring to FIG. 9, an exemplary multiplexing scheme is depicted for decoding the set of control bits and determining which subinstructions if any are to be shared among corresponding FPU's of a VLIW processor. In one embodiment, the processor 20 includes logic for performing such decoding and subinstruction sharing. In the illustrated embodiment, therere two clusters 26 of two functional units 28 per cluster. A VLIW instruction 42 is retrieved from instruction cache 22 and parsed based upon the condition of the set 37 of control bits. The VLIW 42 instruction for such embodiment includes two, three or four subinstruction fields 32.

A multiplexer 44 couples the first functional unit of the second cluster to the first subinstruction field and the third subinstruction field of the instruction 42. A multiplexer 46 couples the second functional unit of the second cluster to the second subinstruction field and the fourth subinstruction field of the instruction 42. According to the decoding scheme in Table 1 above, instruction 42 includes four subinstructions when the set 37 has an encoding condition of 00. Each subinstruction is routed to a separate FPU. Instruction 42 includes three subinstructions when the set 37 has an encoding condition of 01 or 10. When encoded to 01, the multiplexer 44 selects the first subinstruction. Thus, the first functional unit of clusters 1 and 2 share the first subinstruction. The second subinstruction goes to the second FPU of the first cluster. The third subinstruction is shifted over to enter multiplexer 46, which selects such third subinstruction for processing by the second FPU of the second cluster.

When the set 46 is encoded to 10, the first subinstruction goes to the first FPU of the first cluster and the second subinstruction goes to the second FPU of the first cluster. The multiplexer 44 selects the third subinstruction, so the third subinstruction goes to the first FPU in the second cluster. The multiplexer 46 selects the second subinstruction, so the second subinstruction is shared by the second FPU of the first cluster and the second FPU of the second cluster.

Instruction 42 includes two subinstructions when the set 37 has an encoding condition of 11. In such case the multiplexer passes the first subinstruction, so the first subinstruction is shared by the first FPU of the first cluster and the first FPU of the second cluster. Similarly, multiplexer 46 passes the second subinstruction, so the second subinstruction is shared by the second FPU of the first cluster and the second FPU of the second cluster.

Referring to FIG. 10A-E, subinstruction sharing is compared for various instructions 42A to 42E on a processor having n=2 clusters and m=2 FPU's per cluster. Each instruction includes up to four subinstructions 36. The four subinstructions are arranged in two rows to visually correlate the subinstruction to its destination FPU. Specifically, the subinstructions in the top row are destined for the first and second FPU's (1,1), (1,2), respectively, of the first cluster, while the subinstructions in the bottom row are destined for the first and second FPU's (2,1), (2,2), respectively, of the second cluster. In addition, the instruction bit sizes are shown for a subinstruction size equal 32 bits. Shown for each instruction 42 are the intended operation 49 (on left), the instruction 50 (center) with NOP compression only and the instruction 42 compressed for subinstruction sharing (on right).

Table 4, below summarizes the number of instruction bits used to specify different instruction cases with and without the subinstruction sharing. Where N is the number of non-empty subinstruction fields in an instruction, the original compressed instruction will be 32×N-bit long after instruction compression. With the subinstruction sharing, however, there are different lengths depending on the redundancy level in an instruction. If, for example, the control bits 37 are 00, (i.e., no subinstruction sharing), then there are 32×N+2 bits for the instruction, including 2 bits of overhead compared to the original instruction. However, when the control bits 37 are 01 or 10, one subinstruction field is omitted by subinstruction sharing. The result is 32×(N−1)+2 bits, which saves 30 bits for the instruction. For the case, where the control bits are 11, two subinstruction fields are omitted and the number of bits is 32×(N−2)+2, which saves 62 bits for the instruction.

TABLE 4

Number of bits per instruction
(N: number of non-empty subinstruction fields)

| | Number of bits per instruction | | |
|---|---|---|---|
| S bit field | Original | With subinstruction sharing | Difference |
| 00 | 32 × N | 32 × N + 2 | −2 |
| 01 or 10 | | 32 × (N − 1) + 2 | 30 |
| 11 | | 32 × (N − 2) + 2 | 62 |

The actual effect of subinstruction sharing in an image computing program was studied, in which several tight loop routines (2D convolution, 2D complex FFT, and affine warping) were written in assembly language for the MAP1000 processor. The MAP1000 has two clusters of two FPU's per cluster. Assuming that each subinstruction is 32-bits wide, the number of instructions in the tight loop and their redundancy characteristics are listed below in Table 5. For a 2D convolution, the number of instruction bits that can be saved by subinstruction sharing is calculated as −2×48+ 30×40+62×45=3894 bits. The total number of non-empty subinstructions in the convolution tight loop was 337 in 133 instructions. Thus the original program size is 337×32= 10784 bits. Therefore, the subinstruction sharing results in 36.1% reduction in the tight loop program size as shown in Table 6. Similarly, the 2D complex FFT and affine warping tight loops show 23.9% and 41.9% of reduction in the program size, respectively.

TABLE 5

Analysis Of Several Image Computing Function Tight Loops

| Control Bits | Number of instructions | | |
|---|---|---|---|
| Control Bits | 2D convolution | 2D complex FFT | Affine warping |
| 00 | 48 | 220 | 60 |
| 01 or 10 | 40 | 207 | 41 |
| 11 | 45 | 166 | 65 |

TABLE 6

Results Of Subinstruction Sharing In Image Computing Functions

| | Functions | | |
|---|---|---|---|
| | 2D convolution | 2D complex FFT | Affine warping |
| Original program size (total number of non-empty instructions) | 337 | 2097 | 383 |
| Total number of bits reduced | 3894 | 16062 | 5140 |
| Program size reduction % | 36.1% | 23.9% | 41.9% |

Note that the program size reduction discussed above is for the tight loop only. When the caller function is considered together, the effect of subinstruction sharing would be longer. However, the effect is still very significant. Consider, for example, an application program that reads a 512×512 8-bit image, calls the 2D convolution tight loop, and writes the output image back to the memory occupies about 100 kbytes. The total program size reduction achieved by the subinstruction sharing is less than 0.5%. However, since most of the program outside the tight loop is executed only a 10 once while the tight loop is iterated many times, most of the program execution time is in fact spent within the tight loop. In the case of a 2D convolution with a 15×15 kernel on the MAP1000, the tight loop execution time occupies more than 89% of the total execution time. Therefore, fitting the tight loop in the available instruction cache is more important than reducing the whole program size. Moreover, when a more sophisticated tight loop (thus requiring more bits for its instructions) is developed and/or multiple tight loops are combined to form a new higher-level tight loop, it is desirable that the size of individual tight loops be as small as possible so that the new tight loop does not cause instruction cache thrashing, i.e., excessive instruction cache misses while iterating the tight loop.

Method for Identifying and Sharing Redundant Subinstructions

Figure 11:
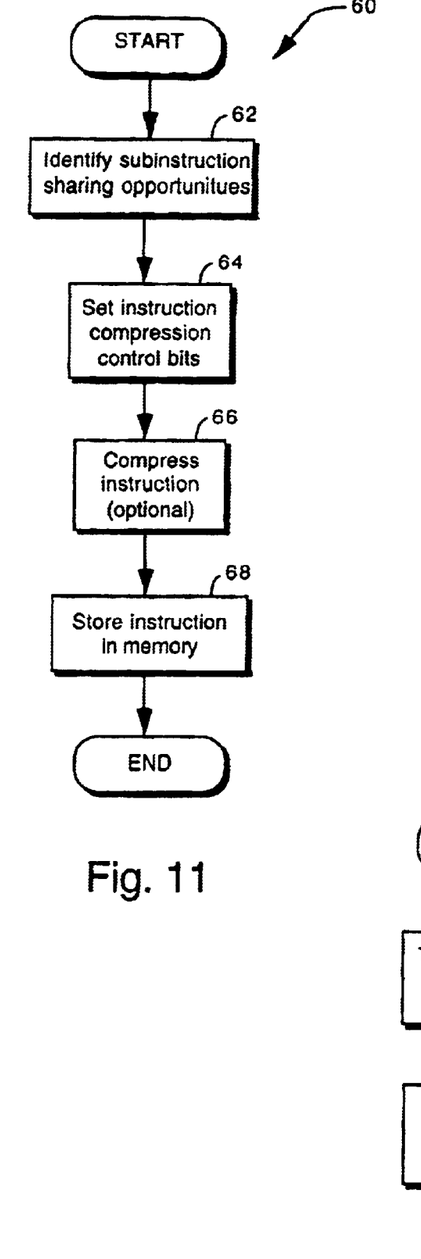
FIG. 11 is a flow chart of a method for setting the instruction-compression control bits.

Referring to FIG. 11, a flow chart 60 for identifying subinstruction sharing opportunities includes a step 62 in which the subinstructions of a given instruction are compared to determine whether a subinstruction sharing condition is present. In one embodiment, any subinstruction which appears for one or more corresponding functional processing units (_,i) of multiple clusters is to be shared. In other embodiments a more limited set of conditions is specified according to a specific design. Table 3 above, for example, lists an example of a limited set of conditions. At step 64 the set 37 of instruction compression control bits is set to identify each subinstruction sharing condition. Thereafter the instruction is stored in memory at step 68. In some embodiments the instruction is stored in an uncompressed format, (or in a format using only conventional compression techniques, such as NOP compression, without the subinstruction sharing compression). In another embodiment, the instruction is compressed at step 66 to omit redundant subinstructions where a subinstruction is to be shared.

Figure 12:
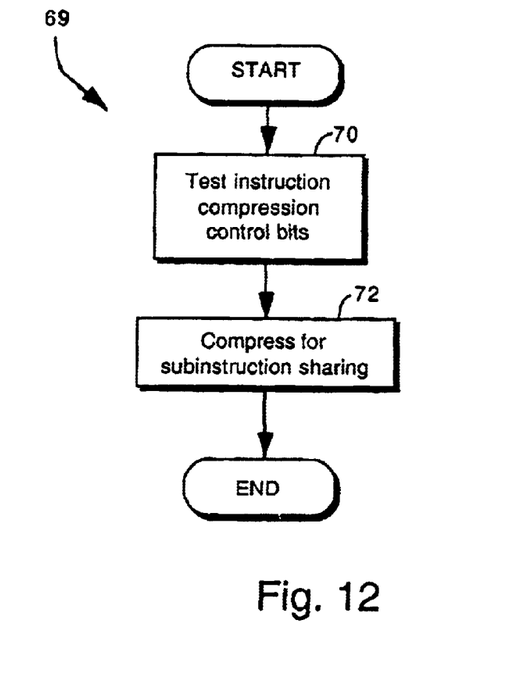
FIG. 12 is a flow chart of a method for compressing an instruction for subinstruction sharing.

For embodiments in which the instruction is stored in memory without removing redundancies for subinstruction sharing, a method is performed at another time to compress or further compress the instruction. Referring to FIG. 12 at step 70 of flow chart 69, the set 37 of instruction-compression control bits are tested to identify subinstruction sharing conditions. According to the encoded condition of the set 37 one or more subinstructions are deleted at step 72 from the instruction format. The deleted subinstructions are redundant subinstructions. An identical subinstruction remains which is to be shared by FPU's. The result is a compressed instruction or a further compressed instruction. Such resulting compressed instruction is routed to an instruction cache 22, a primary cache or into main memory 24. By reducing the size of the instruction, the space required in instruction cache, along with the time required to move the data into the cache are reduced. The method of flow chart 69 is performed in various embodiments when an instruction is moved from main memory 24 into the instruction cache 22 (see FIG. 2) or at another time.

Figure 13:
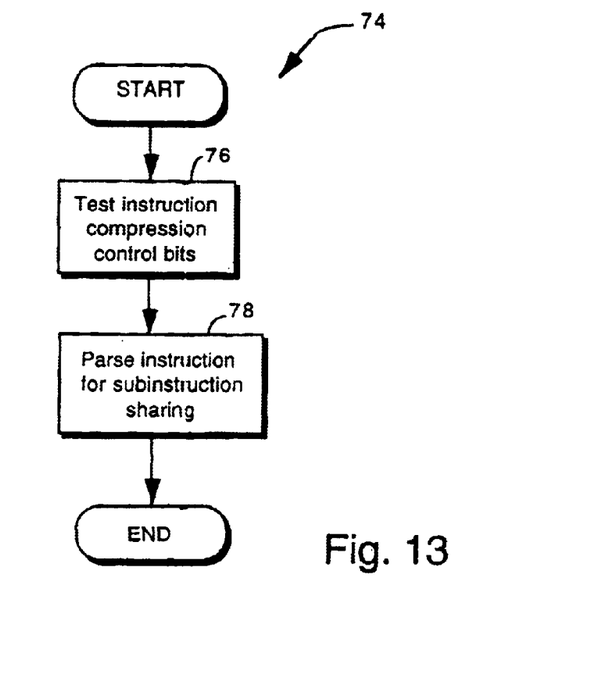
FIG. 13 is a flow chart of a method for decoding the instruction-compression control bits to identify various subinstruction sharing conditions.

Referring to FIG. 13, a flow chart 74 of a method for decoding the set 37 of instruction-compression control bits includes a step 76 of testing the control bits for various subinstruction sharing conditions. At step 78 the compressed instruction 42 is parsed to route the subinstructions to destination FPU's 28. When a subinstruction sharing condition is present, a subinstruction is routed to a plurality of corresponding functional processing units.

Alternative Embodiments, Meritorious and Advantageous Effects

Although subinstruction sharing cases have been described for redundant subinstructions among corresponding FPU's, there are additional situations of redundant subinstructions which also may be covered in some embodiments. For a generic architecture in which an instruction includes 'p' subinstruction fields, there is one situation of no redundant subinstructions, and not more than 2P−1 situations in which there are p=8 subinstruction fields, there are not more than 28=256 situations. Some situations turn out to be the same, so the number of situations is slightly less than 256. To cover every such situation, however, there are 'p' control bits in the set 37 of instruction-compression control bits. Thus, in one embodiment there are 'p' control bits included with each instruction.

However, as the instruction width increases, it may be undesirable to add so many extra control bits for subinstruction sharing. In particular, the cost of so many bits may seem excessive when there tends to be a pattern among the subinstructions redundancies that come up over and over again in practice. As a result, in the preferred embodiments the number of control bits is reduced to less than p to handle a prescribed number of the possible 2p subinstruction sharing situations. Different processors are designed for different application where the pattern of subinstruction redundancies varies. Further the cases of subinstruction redundancies covered for subinstruction sharing are strategically selected for a given processor to have greatest impact on those applications for which the processor is targeted, (e.g., for image processing applications). The preferred embodiments described in the prior sections relate to subinstruction sharing scenarios situations that have been found to occur in strategically important tight loops of common image processing functions.

An advantage of the invention is that the required instruction space in an instruction cache is effectively reduced for VLIW instructions. In particular, for some functions executed during image processing algorithms have occupy tight loops, it is possible to maintain the tight loop without thrashing, where otherwise, thrashing would occur.

Another advantage is that by avoiding some redundancies in VLIW subinstructions, fewer instruction bits are needed, and correspondingly program size is reduced. In addition, efficiency of the instruction cache usage is improved, and instruction fetch bandwidth is increased.

FIG. 8 shows a set 36 of control bit groups 38. Each group 38 includes a plurality of bits 40.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A computer system comprising:

a processor having a very large word instruction architecture and including a plurality of clusters of functional processing units, each one cluster of the plurality of clusters comprising a common number of functional processing units, the processor comprising a first prescribed number of clusters, said very large word instruction architecture allowing an instruction to have up to a second prescribed number of subinstructions, where the second prescribed number equals the first prescribed number times the common number, each instruction to be executed by the processor comprising from one subinstruction up to the second prescribed number of subinstructions, and a set of control bits, the set of control bits including a first subset of control bits equal in number to the second prescribed number, wherein the first subset of control bits identify at least one subinstruction to be shared and a routing pattern for distributing the at least one shared subinstruction; and an instruction cache memory which stores a first VLIW instruction in a compressed format determined by a condition of the first subset of control bits, the compressed format including a at least one shared subinstruction stored in at least one given field of the first VLIW instruction, the at least one subinstruction to be shared by a plurality of the functional processing units, said plurality of functional processing units being determined by said condition of the first subset of control bits, wherein the first subset of control bits allows as many as $2^z$ permutations for subinstruction sharing within any given VLIW instruction, where z equals said second prescribed number.

2. A method for processing a compressed-length VLIW instruction on a processor having a very long instruction word architecture, the compressed-length VLIW instruction including a set of control bits and at least one subinstruction, the processor comprising 'n' clusters, each one cluster of the 'n' clusters comprising a 'm' functional processing units achieving a system having 'n' times 'm' functional processing units, the set of control bits including a first subset of control bits equal in number to 'n' times 'm', wherein the first subset of control bits identify at least one subinstruction to be shared and a routing pattern for distributing the at least one shared subinstruction, the method comprising the steps of:

loading the compressed-length VLIW instruction into a cache;

testing the first subset of control bits of the compressed-length VLIW instruction to determine distribution of the at least one subinstruction, wherein each one functional processing unit of the 'n' times 'm' functional processing units receives one of a no-operation subinstruction or a subinstruction expressly included among the at least one subinstruction, wherein the first subset of control bits allows as many as $2^z$ permutations for subinstruction sharing within any given VLIW instruction, where z equals 'n' times 'm'.

* * * * *